No. 780,427. PATENTED JAN. 17, 1905.
L. JOHNSON.
CENTRIFUGAL BUTTER MAKING MACHINE.
APPLICATION FILED MAY 23, 1904.

Witnesses:
Wm. Geiger
H. W. Munday

Inventor:
Lars Johnson
By Munday, Evarts & Adcock
Attorneys

No. 780,427.

Patented January 17, 1905.

UNITED STATES PATENT OFFICE.

LARS JOHNSON, OF CHICAGO, ILLINOIS.

CENTRIFUGAL BUTTER-MAKING MACHINE.

SPECIFICATION forming part of Letters Patent No. 780,427, dated January 17, 1905.

Application filed May 23, 1904. Serial No. 209,154.

*To all whom it may concern:*

Be it known that I, LARS JOHNSON, a citizen of the United States, residing in Chicago, in the county of Cook and State of Illinois, have invented a new and useful Improvement in Centrifugal Butter - Making Machines, of which the following is a specification.

This invention relates to centrifugal machines for making butter; and its object has been the simplification and cheapening of the machine from previous constructions.

The nature of my improvement will be fully understood from the accompanying drawings and subjoined description.

Figure 1:
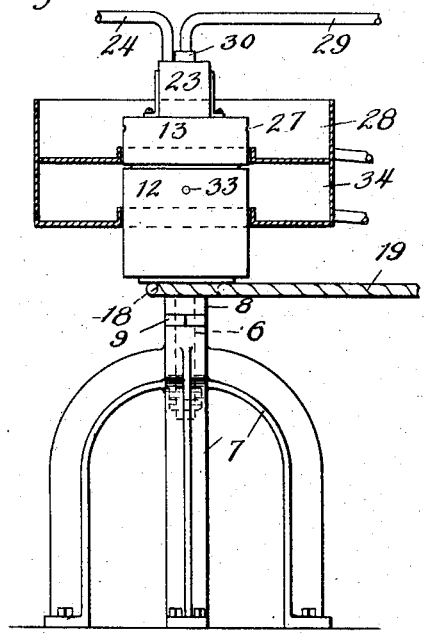
Figure 2:
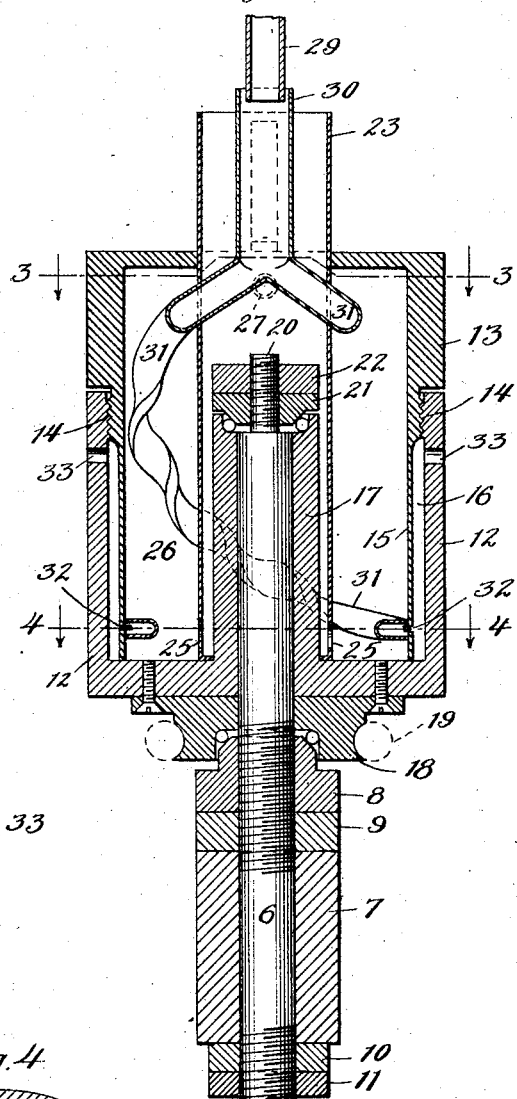
Figure 3:
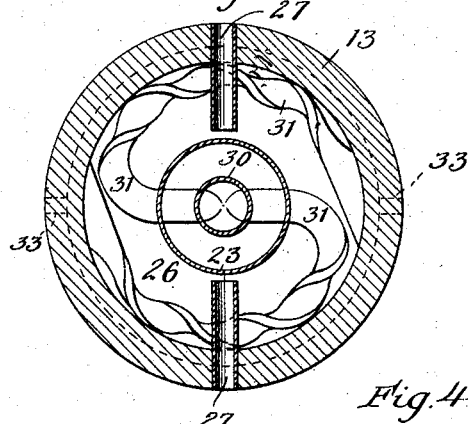
Figure 4:
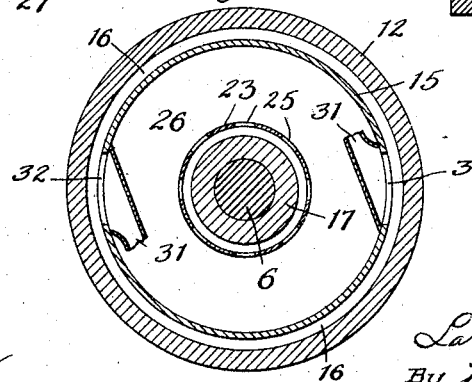

In the accompanying drawings, Figure 1 is an elevation, partly in section, of my improved butter-making machine. Fig. 2 is an enlarged detail vertical section of the butter-making portion of the apparatus. Figs. 3 and 4 are sections on the lines 3 3 and 4 4 of Fig. 2, respectively.

In said drawings, 6 represents a vertical pivot-support in a frame 7 and secured therein preferably by nuts 8, 9, 10, and 11, as will be understood from Fig. 2, the nuts 8 and 9 being above the frame and the nuts 10 and 11 below it. The upper nut 8 is fashioned to serve as the cone of a ball-bearing.

Supported upon and rotating upon the pivot 6 is the butter-making vessel, made in two parts, 12 being the lower part and 13 the upper. These parts are threaded together at 14, and the upper part has a depending skirt 15, adapted to contact with the bottom of the part 12 and form a water-tight joint at the junction. An annular chamber or passage 16 is formed between this skirt and the inner surface of the lower section 12. The lower section 12 has a cylindrical portion 17 surrounding the pivot and fashioned at its upper end to form the cup of a ball-bearing. This cylinder is preferably integral with the rest of the lower section. Below the lower section and rigidly fastened thereto is a pulley 18, receiving the belt 19 and serving as means of rotating the butter-making vessel. This pulley is also adapted to serve as the cup of a ball-bearing, as plainly shown in Fig. 2. At the upper end of the pivot is a screw 20, upon which are mounted the nuts 21 and 22, the lower nut 21 being shaped to serve as the cone of the upper ball-bearing.

From the description thus far given it will be seen that the butter-making vessel is adapted to be rotated very rapidly; but it should be understood that the method of supporting and actuating the vessel may greatly vary, and I do not wish to be limited to the construction shown as to either of these features.

Extending centrally down and through the chamber of the vessel is a water-conducting cylinder or pipe 23, to which water is fed by a supply-pipe 24 entering its upper end. The cylinder 23 forms a close joint with the bottom of the lower section 12, but near said bottom is provided with perforations 25, through which the water issues into the main chamber 26 of the butter-making vessel. The water thus admitted to chamber 26 moves upward through the same and passes out at ports 27 into a surrounding trough or collector 28. This water is utilized while in the chamber 26 as a means of cooling the cream to the desired temperature, and in order that it may do this I feed the cream from a supply-pipe 29 into a tube 30, located centrally of the water-tube 23. The tube 30 branches at its entrance into the chamber 26, connecting with two or more cooling-pipes 31. These cooling-pipes extend downward through the chamber 26 and deliver the butter which is formed in them, together with such fluid portions of the cream as do not enter into the butter, at ports 32, opening into the annular chamber 16. The pipes 31 are peculiar in their construction. As will be seen from the drawings, they are flattened and preferably twisted, and they extend through the chamber to the bottom of the skirt in a spiral manner, so that their length is considerably greater than the height of the chamber. My object in adopting the flattened form of pipe is to insure the uniform cooling of the cream. Such form of pipe requires the cream to spread out in a thin sheet, so that all parts of the stream may be cooled uniformly, and by twisting the pipes it will be noticed that the two edges of the pipes reverse their relative positions at frequent intervals in the length of the pipes, so that the edges are alternately innermost and outermost. In consequence of this the cream is kept in a state of agitation, by which the butter-sacks are broken up, and by this means I obtain from the cream in its passage through the pipes the butter-fat fully separated from the skim-milk in a much larger percentage than has been possible heretofore, and by giving the pipes the increased length due to the spiral bending the cream is subjected to the action of the cooling-water for a long time sufficient to bring it to the proper temperature required in the operation. The butter-fat and the liquid portions of the cream are delivered from the passage or chamber 16 at the ports 33 into the collecting-trough 34.

In my use of this apparatus I find no clogging or stoppage of the pipes 31 ever occurs, the incoming fresh cream apparently acting to prevent any stoppage of previously-entering cream or of the butter-fat in the pipes, also that the cream may be admitted at the temperature which it receives in pasteurizing, it only being necessary in that case to have the water cooled to a sufficient degree to bring the cream to the temperature required in butter-making, and by using a pasteurized cream an article of butter free from bacteria and wholly pure may be obtained. The apparatus is also adapted to act upon cream with which a ripener has been mixed in proper proportion, and when the ripener is thus present in the cream it will develop gradually after the butter has been salted and packed. The temperature of the cooling-water is of course governed by that of the cream. If the latter is cool, the water is not required to be so cold as otherwise.

Among the advantages of the apparatus are the simplicity of the construction and consequent cheapness of manufacture and the ease with which it can be cleared. It only requires to be separated at the joint 14, and no tight joints are required to be made when the parts are put together, except at the bottom of the skirt where the water should be perfectly excluded from the passage 16. The cream-pipe is attached to the upper part and comes off with it, and hence can be readily cleaned.

The invention is well fitted to be used in the ordinary separator and run in the same manner and at the same speed as the separator, and it effects a very complete separation of the butter-fat from the skim-milk.

I claim—

1. The centrifugal butter-making vessel having a flattened and twisted cream-feeding pipe immersed in the cooling-water and a chamber containing such water.

2. The centrifugal butter-making vessel having a flattened and twisted cream-feeding pipe and a water-chamber in which said pipe is immersed and spirally arranged.

3. The centrifugal butter-making vessel having a water-chamber 26 and a flattened and twisted cream pipe or pipes arranged in said chamber, in combination with means for supplying the water and the cream.

4. The centrifugal butter-making vessel having a water-chamber 26 and a flattened and spirally-arranged cream pipe or pipes located in said chamber, in combination with means for supplying the water and the cream.

5. The centrifugal butter-making vessel having a water-chamber 26 and made in two separable parts, the upper part having a skirt extending to the bottom of the lower part and supporting a cream-cooling pipe and a water-tube for conducting the water to the bottom of said chamber.

6. The centrifugal butter-making vessel, having a water-chamber 26 made in two separable and horizontally-divided parts, the upper part having a skirt extending to the bottom of the lower part, and cream-feeding pipes located in the chamber and attached to said upper part.

7. The centrifugal butter-making vessel having a water-chamber 26 and made in two separable parts, the upper part having a skirt extending to the bottom of the lower part and a cream-cooling pipe attached to said upper part and having its lower end inserted in said skirt.

8. The centrifugal butter-making vessel having a water-chamber 26 and made in two separable parts, the upper part having a skirt extending to the bottom of the lower part and supporting a cream-cooling pipe and said pipe having its lower end secured to said skirt and debouching into a passage formed between the skirt and the lower part of the vessel.

LARS JOHNSON.

Witnesses:
H. M. MUNDAY,
EDW. S. EVARTS.